(12) United States Patent
Dworzan (10) Patent No.: US 7,695,267 B2
(45) Date of Patent: Apr. 13, 2010

(54) RIB FORMING APPARATUS AND METHOD

(75) Inventor: Bill Dworzan, Santa Ana, CA (US)

(73) Assignee: Dynaflex International, Anaheim, CA (US)

( * ) Notice: Subject to any disclaimer, the term of this patent is extended or adjusted under 35 U.S.C. 154(b) by 142 days.

(21) Appl. No.: 11/495,006

(22) Filed: Jul. 29, 2006

(65) Prior Publication Data

US 2007/0267778 A1    Nov. 22, 2007

Related U.S. Application Data

(63) Continuation-in-part of application No. 11/435,834, filed on May 16, 2006.

(51) Int. Cl.
*B29C 51/20* (2006.01)
*A21C 11/00* (2006.01)
*B28B 1/00* (2006.01)
*B29C 24/00* (2006.01)

(52) U.S. Cl. .................. 425/343; 425/384; 425/396; 264/286; 264/296

(58) Field of Classification Search .................. 425/322, 425/335, 163, 289, 353, 355, 369, 370, 87, 425/472, 813, 343, 384, 396; 264/164–165, 264/251, 239, 285–287, 296
See application file for complete search history.

(56) References Cited

U.S. PATENT DOCUMENTS

| | | | | |
|---|---|---|---|---|
| 3,969,473 A | * | 7/1976 | Meek | 264/505 |
| 4,205,544 A | * | 6/1980 | Foster | 72/307 |
| 4,791,800 A | * | 12/1988 | Alexander | 72/180 |
| 5,788,630 A | * | 8/1998 | Furnish | 600/232 |

* cited by examiner

*Primary Examiner*—Joseph S. Del Sole
*Assistant Examiner*—Nahida Sultana
(74) *Attorney, Agent, or Firm*—Clement Cheng (57) ABSTRACT

A rib forming apparatus has an elongated support table, a supply of thermoplastic sheet material over the table, a transporting means having at least two transverse carriages mounted on the table to slide along longitudinal edges thereof, a thermal means mounted on one of the carriages for locally heating the sheet material in preparation of a molding press, and at least one press module mounted on another carriage and having a reciprocating press blade positioned at one flat side of the sheet material and a couple of swiveling press blades positioned at the opposite flat side of the sheet material and movable toward the reciprocating press blade to mold the heated section of the sheet material by closing the above three press blades toward each other, whereby a series of vertical rib folds are formed transversely of the sheet material and advanced by the transport means through the closed press blades.

11 Claims, 11 Drawing Sheets

RIB FORMING APPARATUS AND METHOD

This application is a continuation in part of Dworzan U.S. patent application Ser. No. 11/435,834 filed May 16, 2006.

CROSS REFERENCE TO RELATED APPLICATIONS

Smith U.S. Pat. No. 5,477,639
Smith U.S. Pat. No. 5,615,517
Dworzan U.S. patent application Ser. No. 11/435,834

BACKGROUND OF THE INVENTION

A. Field of the Invention

The present invention relates to a plastic forming apparatus for making a plastic panel with transverse ribs. More particularly, the present invention relates to a manufacturing apparatus for making a plastic panel with rib folds such as a root barrier panel material used in the landscaping field to control outgrowth of tree roots.

B. Description of the Prior Art

Folding machines for sheet plastic or sheet metal or the like are plenty. A more advanced type of such an apparatus is disclosed in U.S. Pat. No. 6,939,284 to Trovinger at al. the disclosure of which is incorporated herein by reference. Trovinger teaches a sheet folding apparatus with a rounded fold blade. Trovinger's patent makes a single center fold of a piece of sheet using a fold roller that runs around a round fold blade and depresses the sheet material between the fold blade. When regularly distanced transverse folds are necessary on a continuous supply of plastic sheet for use in various constructive walls that need ribs, this and other known devices come short in providing an adequate speed and quality of evenly spaced ribbed sheets or plates.

An object of the present invention is to provide an automatic rib forming apparatus for thermoplastic sheet plastic that is mechanically simplified and optimized to produce a speedy folding of well-defined ribs from a flat surface.

Another object of the present invention is to provide a novel combination of rack-and-pinion gears with four-bar linkage of parallel motion to mold and advance the sheet material to optimize the otherwise complex machine operations.

Yet another object of the present invention is to provide a method of forming an elongated panel with transverse ribs with improved efficiency.

SUMMARY OF THE INVENTION

The rib forming apparatus of the present invention is generally used to manufacture a long plate article that has a plurality of transverse folds formed as integral ribs for various purposes. Examples of such a plate article are general-purpose wall elements with reinforcing ribs or ribs having a special function of self-locking feature such as described in an applicant's earlier application Ser. No. 11/435,834 titled "Root Barrier", hereby incorporated by reference.

Typically, the barrier product is introduced in landscape linear applications. A cut of such barrier product may be flexed into a circular form and locked onto itself by joining opposite end ribs so that one rib clips the other without requiring separate fasteners.

A rib forming apparatus according to the present invention comprises an elongated support table, a supply of thermoplastic sheet material over the table, a transporting means having at least two transverse carriages mounted on the table to slide along longitudinal edges thereof, a thermal means mounted on one of the carriages for locally heating the sheet material in preparation of a molding press, and at least one press module mounted on another carriage and having a reciprocating press blade positioned at one flat side of the sheet material and a couple of swiveling press blades positioned at the opposite flat side of the sheet material and movable toward the reciprocating press blade to mold the heated section of the sheet material by closing the above three press blades toward each other, so that a series of vertical rib folds are formed transversely of the sheet material and advanced by the transport means through the closed press blades. The transport means also includes a hydraulic or air power source flexibly connected to the carriages.

The three interconnected carriages straddle across the table and are slidingly mounted on two parallel rods, which extend longitudinally and fixedly mounted on the table. The first longest carriage at the entry may be made of a hollow structure of steel, aluminum or any other material with a good mechanical strength to carry the thermal means comprising two identical electric heaters where the plate material is first introduced.

The first carriage shuttles between two sliding positions relative to the plate material by a longitudinal carriage actuator, which is preferably mounted under the table and connected to a hydraulic or electric power source not shown. The heaters on the carriage contain two parallel hot wires distanced correspondingly with the even pitch of the ribs to be molded and are positioned right above the plate material to heat its two transverse sections to prepare the plate for the rib molding.

With a short distance to the first carriage a second carriage is resiliently connected through a couple of spring-biased expansive fasteners at either end thereof and carries a second press, which is operated by its designated vertical actuator. The carriage and press actuators of the present invention may be commonly connected to a single hydraulic or electric power source through an appropriate pipage along the sides of the support table. An end carriage is similarly connected to the second carriage through a couple of spring-biased expansive fasteners. Therefore, the three carriages permit the thermal station and molding station to shuttle together in a loose unity along the rods due to the single carriage actuator.

The advancement of the plate material may be effected by the crimping grip of the presses combined with the telescoping operation of the carriage actuator. The press grabs the material and pulls it to advance new and unformed material.

The molding press comprises two opposite base plates attached to a common carriage facing each other and two back-to-back rack-and-pinion gear set on each of the base plates for forming two parallelogram linkages actuated by an actuator with reciprocating rods, which are attached to the distal ends of the two rack gears so that the rack gears reciprocate at the same time. The movements of each rack gear rotate two pinion gears that are meshed therewith. Arms rotationally fixed to the respective pinion gears and cross-links pivotally connecting two adjacent arms form a pair of parallelogram linkages, which are then synchronized by transverse shafts with the counterparts on the opposite parallelogram linkages formed in mirror image on the opposing base plate.

But two rack gears on one of the two base plates have free ends with no actuator directly connected thereto. Instead, the rack gears are driven by an upright molding blade acting as a central mold of a triple mold system of the present invention.

The central blade is shaped like an inverted T made of metal or a comparatively strong composite material and has a corner chamfered at an end and a similar corner at the opposite end.

The attachments between the rack gears and molding blade may be done through welding or using mechanical fasters, which need boring through the adjacent walls.

Extending along the sides of the central blade are a pair of side molding blades that are affixed to the cross-links of the opposing base plates respectively at their ends close to the table so that upon swivel movements of the cross-links the side blades exert a crimping force laterally as well as vertically against the plate material over the central blade as it moves vertically toward the closing side blades resulting in a crimp molding of the ribs of the plate material from three sides. The ribs will be formed at an even interval along the length of the flat material.

In the preferred embodiment where two press modules are installed side by side, upon retraction of the carriage actuator with simultaneous extensions of the press actuators, the whole rib forming apparatus slides over the plate material two pitches corresponding to two ribs and their adjacent plate sections back toward its fresh blank section to mold another two ribs at the same time.

As soon as the plate material receives new rib crimping at the molding phase, the subsequent extension of the carriage actuator automatically advances the processed plate section one pitch followed by another retraction of the same actuator for the next rib molding. Meanwhile, the plate material is held from moving backward with the assist of a simple angled stick fixed to an output area of the table for catching the ribs one way.

The present invention also provides the method of making integral ribs on a thermoplastic sheet material. Unreeled sheet from a roll run through two heaters with suspended heat cores under which upward bends of the sheet are initiated during a thermal deformation that also softens the sheet in preparation for the subsequent hot clamp-molding step. For a set pitch of the ribs, the distance of the heaters from each other and the adjacent press is firmly determined considering the shrinking length of the plate by the right-angled sidewalls and the connecting bends which amount to two adjacent ribs. The pitch may be modified by adding distance between the presses with the use of a spacer affixed to one of the base plates at its abutting side and correspondingly increasing the distance between the heaters.

By closing the central blade and side blades the upright ribs are molded across the width of the sheet.

As rack gears switch from their extended position to retracted position along with the central blade swinging the side blades apart, they are transported back to the molding position from where they had released the last rib. With the ribs closed in the presses they will advance all together to output the finished plate section pulling the next hot areas of the plate toward the molding positions.

According to a third embodiment of a rib forming apparatus of the present invention orientation of the apparatus may be vertical instead of horizontal. By having the entire apparatus turned with appropriate frame modification, it requires less floor space. Changing the direction of advancement of the plate material brings the advantage of gravity effect of naturally straightening the finished plate. In this orientation, the rib forming apparatus may be installed as a vertical end unit to a bigger plastic processing plant.

BRIEF DESCRIPTION OF THE DRAWINGS

Similar reference numbers denote corresponding features throughout the attached drawings.

DETAILED DESCRIPTION OF THE PREFERRED EMBODIMENT

Figure 1:
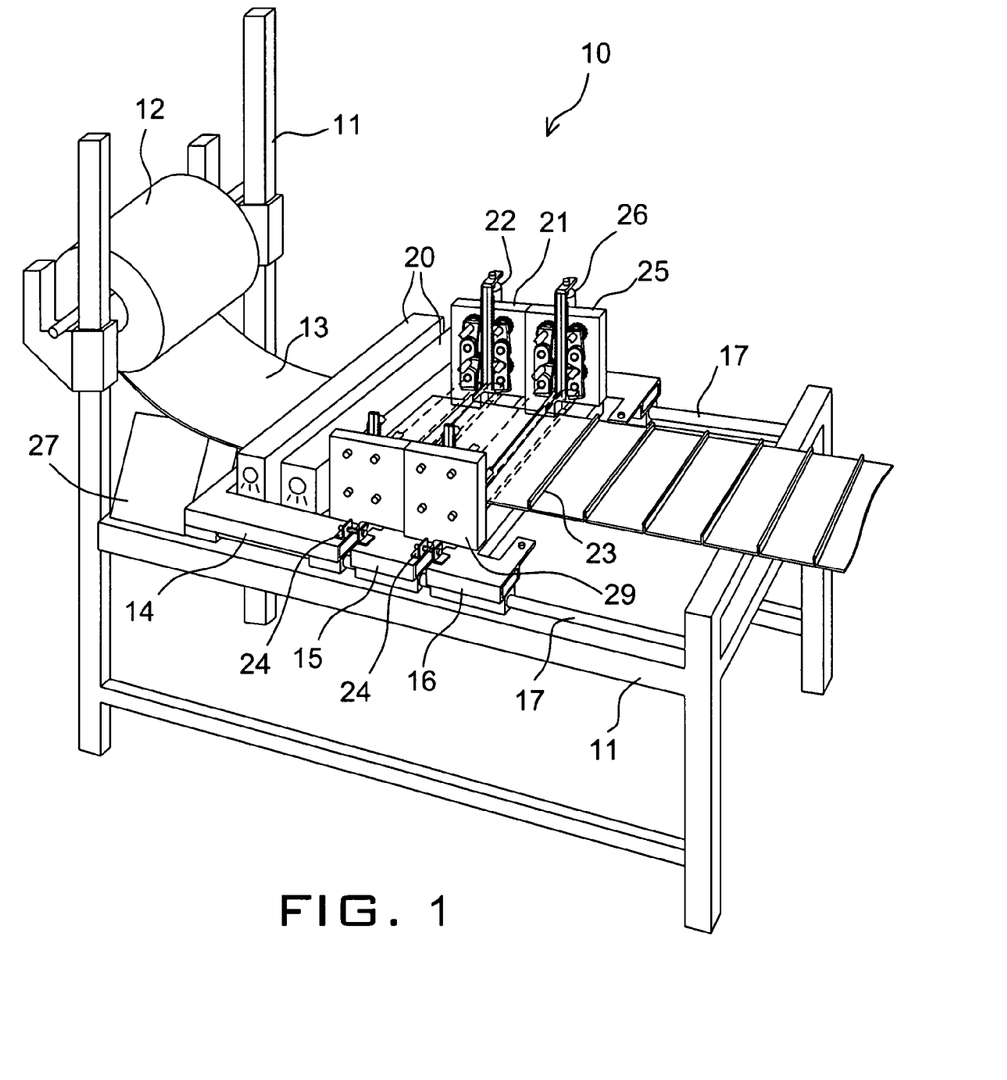
FIG. 1 is a perspective view of a rib forming apparatus according to the present invention.

FIG. 1 generally depicts a rib forming apparatus 10 according to a first embodiment of the present invention. The apparatus 10 has a support table 11 of steel framework, on which a roll 12 of a thermoplastic web material is held at a starting end to release a continuous supply of an elongated plate 13 to mold with ribs integrally formed to it.

The rib forming apparatus 10 of the present invention is generally used to manufacture a long plate article that has a plurality of transverse folds formed as integral ribs for various purposes. Examples of such plate article are general-purpose wall elements with reinforcing ribs or ribs having a special function of self-locking feature such as described in an applicant's earlier application Ser. No. 11/435,834 titled "Root Barrier", hereby incorporated by reference.

A cut of such barrier product may be flexed into a circular form and locked onto itself by joining opposite end ribs so that one rib clips the other without requiring separate fasteners. More detail of the root barrier will be discussed hereinafter.

The rib forming apparatus 10 has three interconnected carriages 14 to 16 that straddle across the table 11 and are slidingly mounted on two parallel rods 17, which extend longitudinally and fixedly mounted on the table 11.

The first longest carriage 14 at the entry may be made of a hollow structure of steel, aluminum or any other material with a good mechanical strength to carry a thermal station comprising two identical electric heaters 20 where the plate material 13 is first introduced.

The first carriage 14 shuttles between two sliding positions relative to the plate material 13 by a longitudinal carriage actuator, which is under the table 11 and is connected to a hydraulic or electric power source not shown. The heaters 20 on the carriage 14 contain two parallel hot wires distanced correspondingly with the even pitch of the ribs to be molded and are positioned right above the plate material 13 to heat its two transverse sections to prepare the plate 13 for the rib molding.

Also fixed to the first carriage 14 at its exit side is a first press 21 activated by a vertical actuator 22 and crimps the plate material 13 from its top and bottom sides to mold one of the ribs 23.

With a short distance to the first carriage 14 a second carriage 15 is resiliently connected through a couple of spring-biased expansive fasteners 24 at either end thereof and carries a second press 25, which is operated by its designated vertical actuator 26. The carriage and press actuators of the present invention may be commonly connected to a single hydraulic or electric power source through an appropriate pipage along the sides of the support table 11. In order to follow the sophisticated movements between the components of the rib forming apparatus 10, it is preferable to use a flexible connector like elastomeric pipes for the hydraulic actuation. A control box 27 may contain power level monitors and an input interface for an operator to control the power supply to the actuators although the rib forming according to the present invention is automatic after an initial setup and requires little to no human intervention.

The rib forming apparatus 10 may be easily integrated into an existing thermoplastic molding plant in order to manufacture the ribbed plate as the plastic web is extruded or molded. In this case, the heaters 20 may be omitted because the material is already in a soft state for the immediate molding process of the present invention.

An end carriage 16 is similarly connected to the second carriage 15 through a couple of spring-biased expansive fasteners 24. Therefore, the three carriages 14-16 permit the thermal station and molding station shuttle together in a loose unity along the rods 17 due to the single carriage actuator.

The number of the rib-forming press is arbitrary as it fits the individual requirements based on the space available, production rate desired or any other factors considered. Because the molding press 25 on the second carriage 15 is modular the number of such presses may be easily changed as necessary with the corresponding change in the number of the heaters 20.

Like this embodiment where presses used are two as well as single or several units, the advancement of the plate material 13 may be effected by the crimping grips of the presses 21, 25 combined with the telescoping operation of the carriage actuator. When a higher number of presses are combined, it is practical to have a dedicated transporting means for the processed plate sections instead of shuttling the whole carriage group a longer distance to meet a blank plate material unreeled from the web 12. In that case, the thermal and molding stations may be made stationary relative to the table 11 and a nib roller device may be installed as is well known in the skill of material handling.

Figure 2:
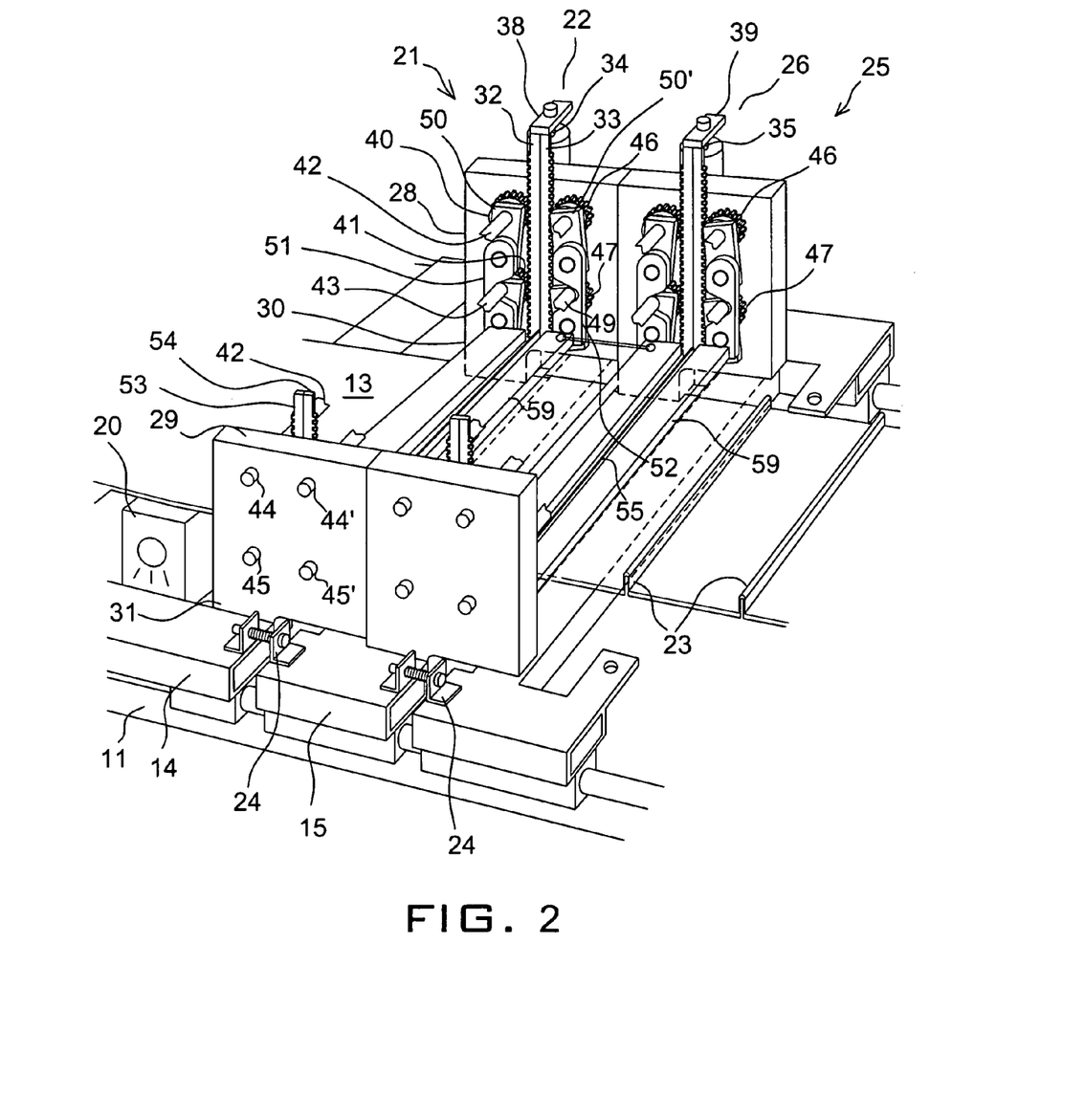
FIG. 2 is an enlarged perspective view of a press station of the rib forming apparatus of FIG. 1.

Referring to FIG. 2, the mechanism of the molding station of the present rib forming apparatus will be described.

The press 21 has two rectangular base plates 28, 29 with legs 30, 31 attached to the opposite ends of the carriage 14 perpendicularly. On each of the base plates 28, 29 a pair of rack-and-pinion mechanisms are installed in a symmetrical manner.

Two pairs of rack gears 32, 33 are positioned longitudinally of and close to each of the base plates 28, 29. The rack gears 32, 33 are held back to back across the inner surface of the base plates 28, 29 and the actuators 22, 26 have reciprocating rods 34, 35 attached to the distal ends of the rack gears 32, 33 by cross members 38, 39 so that the rack gears 32, 33 reciprocate at the same time. The actuators 22, 26 are connected to a hydraulic power source or air power source, not shown.

Meshing with the rack gear 32 two pinion gears 40, 41 are fixed to two parallel transverse shafts 42, 43 rotationally received in bores 44, 45 formed in the opposing base plates 28, 29 to cooperatively position the shafts 42, 43 in parallel across the carriage 14. Likewise, another pair of pinion gears 46, 47 are in mesh with the rack gear 33 and fixed to two parallel shafts 48, 49 rotationally received in bores 44', 45' formed in the opposing base plates 28, 29 to cooperatively position the shafts 48, 49 in parallel across the carriage 14.

Therefore, two pairs of pinion gears 40, 41 and gears 46, 47 in the base plate 28 are simultaneously in mesh with the rack gears 32, 33 from the opposite sides to provide well balanced transmissions of the linear motion of the rack gear 32 into the rotational displacement of the pinion gears 40, 41, 46, 47.

The opposite base plate 29 has a similar rack-and-pinion gearing fixed to the other ends of the shafts 42, 43 and shafts 48, 49 without an actuator because the actuator 22 activates both sides of the gear mechanisms in the first modular press 21.

In addition, each of the pinion gears 40, 41, 46, and 47 has an assigned arm 50 fixed immovably to the respective pinion shafts. When the rods 34, 35 of the actuators 22, 26 are in their extended positions the arms 50 are oriented to extend substantially parallel to the rack gears 32, 33 on the base plate 28 toward the proximal ends of the gears 32, 33. On the other hand, when the rods 34, 35 go to their retracted positions the four arms 50 swing away from the rack gear 32 at the same time wherein the arms 50 of the pinion gears 40, 41 are slanted about their respective shafts 42, 43 at a common angle such as 80° while the arms 50 of the pinion gears 46, 47 are slanted similarly but at a symmetrical posture to the arms 50 at the other side with reference to the center line between the two rack gears 32, 33.

Then, the distal ends of the two arms 50 at the side of the rack gear 32 are joined by a cross-link 51 to form a parallelogram linkage whereby the cross-link 51 follows the swinging translations of the pinion gears 40, 41 in a parallel posture relative to the gear 32. The cross-link 51 has a side cut facing the gear set 32, 33 to accept rather than colliding with the shaft 43 when the arms 50 and cross-link 51 come into a superimposing relationship with each other.

Likewise, the distal ends of the two arms 50 at the side of the rack gear 33 are joined by a cross-link 52 to form another parallelogram linkage whereby the cross-link 52 follows the swinging translations of the pinion gears 46, 47 in a parallel posture relative to the gear 33. The cross-link 51 has a side cut facing the gear 33 to receive the shaft 49 when the arms 50 and cross-link 52 come into a superimposing relationship with each other.

Across the table a mirror image of this double parallelogram linkage is installed on the inner side of the base plate 29 except that two rack gears 53, 54 have free ends with no actuator directly connected thereto. Instead, the rack gears 53, 54 are driven by an upright molding blade 55 acting as a central mold of a triple mold system of the present invention.

Figure 3:
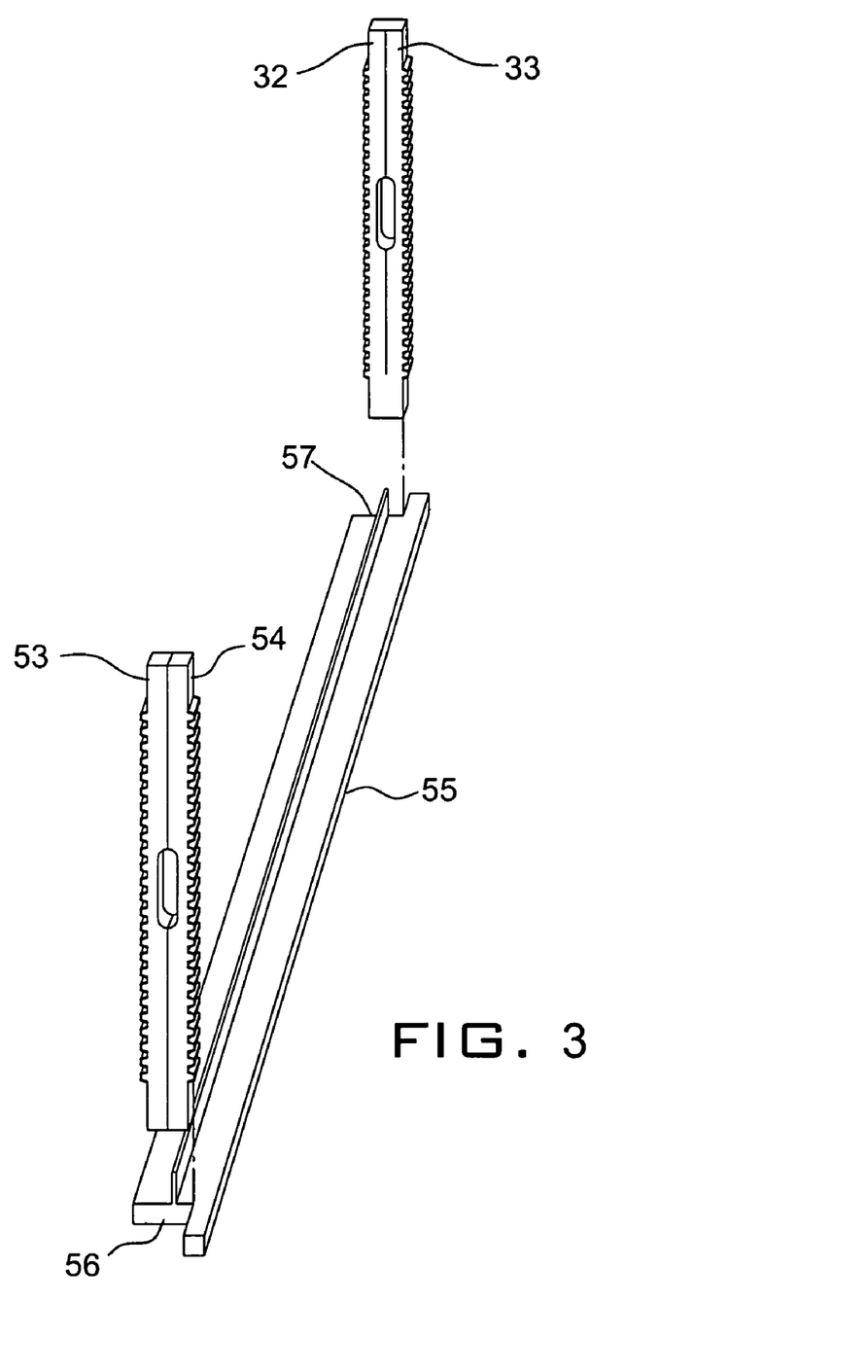
FIG. 3 is an exploded perspective view showing a molding blade assembly of the press station of the rib forming apparatus.

As clearly shown in FIG. 3, the central blade 55 is shaped like an inverted T made of metal or a comparatively strong composite material and has a corner 56 chamfered at an end and a similar corner 57 at the opposite end. The rack gears 53, 54 are attached to the corner 56 as the other rack gear set 32, 33 is attached to the corner 57. The attachments between the rack gears and molding blade 55 may be done through welding or using mechanical fasters, which need boring through the adjacent walls.

Extending along the sides of the central blade 55 are a pair of side molding blades 58, 59 that are affixed to the cross-links 51, 52 of the opposing base plates 28, 29 respectively at their ends close to the table 14 so that upon swivel movements of the cross-links 51, 52 the side blades 58, 59 exert a crimping force laterally as well as vertically against the plate material 13 over the central blade 55 as it moves vertically toward the closing side blades 58, 59 resulting in a crimp molding of the ribs 23 from three sides. The ribs 23 will be formed at an even interval along the length of the flat material 13.

Therefore, while the double parallelogram linkage at the side of base plate 28 constitutes a driving side of the molding press 21 the opposing base plate 29 with the mirror image of the mechanism of the driving components becomes a driven end of the press 21 through the molding blades 55, 58 and 59.

Figure 4A:
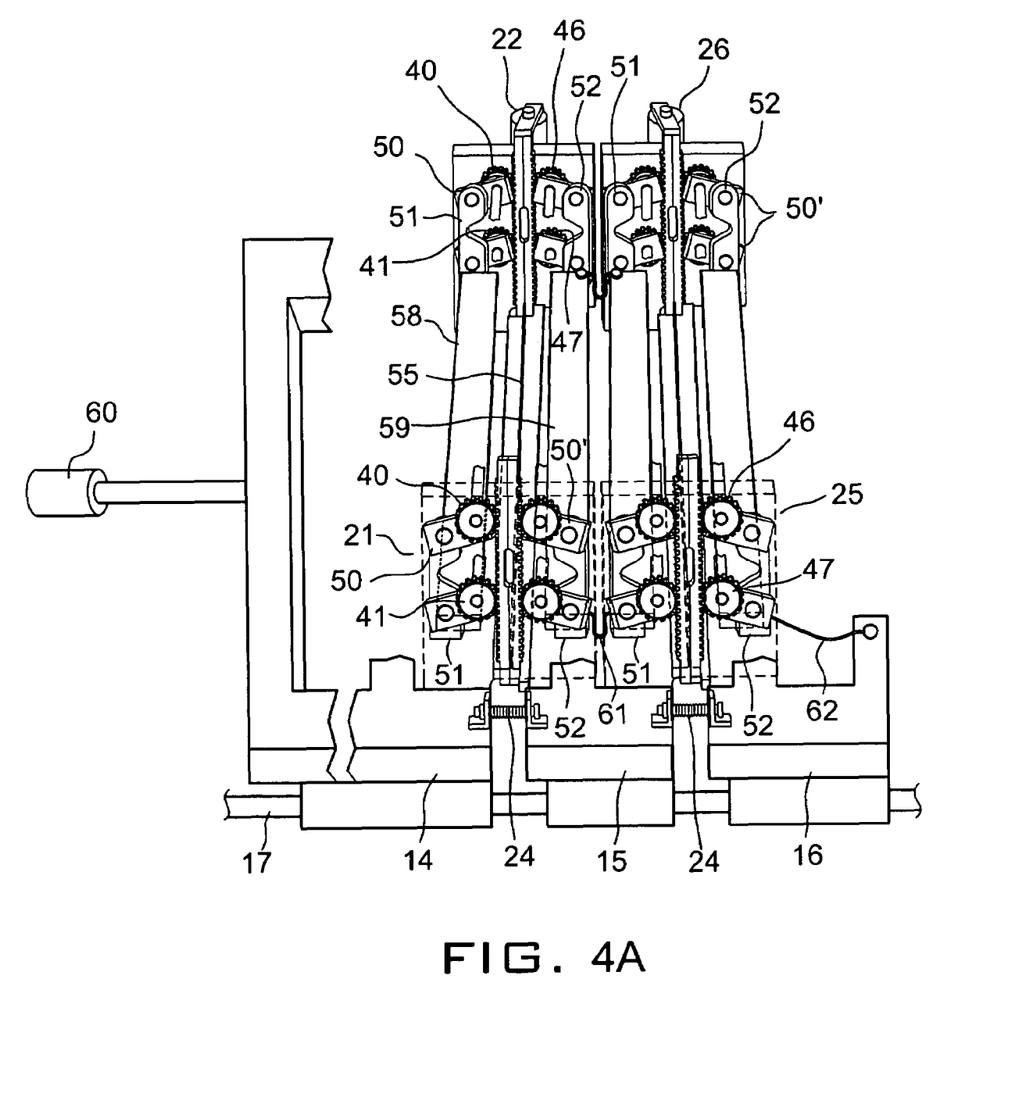
FIG. 4A is a perspective view of a first upper stroke of a molding cycle of the press station showing a double molding press in its open position ready for an introduction of an elongated web material to shape.
Figure 4B:
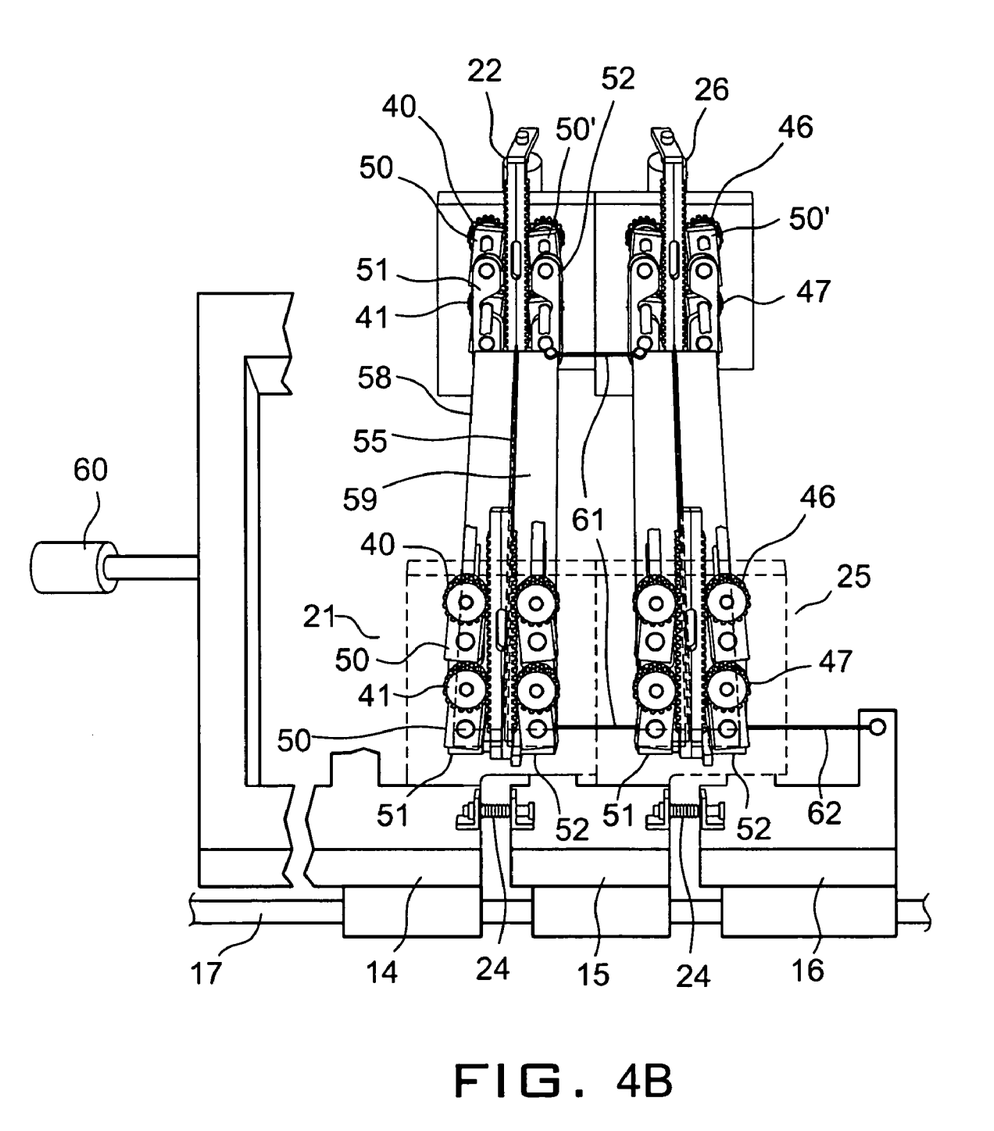
FIG. 4B is a perspective view of a second lower stroke of a molding cycle of the press station showing the double molding press in its closed position to effect the molding of series of transverse ribs on the web material, which is omitted for clarity.

FIGS. 4A and 4B are side perspective views for showing more detailed change of state of the molding station between molding and releasing phases with the surrounding components shown partly in schematic. Initially, the longitudinal carriage actuator at 60 for shuttling the first carriage 14 along the rod 17 is at its extended state to which the press actuators 22, 26 are timed to stay inactivated where the central blade 55 and side blades 58, 59 are free from each other so that the plate material (omitted for simplicity) extends in the open space formed between the central blade 55 and the opposing side blades 58, 59. Additionally, the carriages 14-16 are in an open position due to the expansive fasteners 24, which however limit the distances of the carriages 14-16 from each other. So, the carriages 14-16 will generally travel as a single body.

Also, a pulling cable 61 is attached to the cross-link 52 of the first press 21 at one end and to the adjacent cross-link 51 of the next press 25 at the opposite end for tautening all the carriages 14-16 toward each other when the rib forming apparatus 10 is in a molding phase as shown in FIG. 4B. This is to compensate the longitudinal shrinking of the plate material due to the crimped ribs 23 eliminating any slacks, which may affect the flatness of the final product. The cable 61 is shown loosely connecting the first and second presses 21, 25 in their open positions in FIG. 4A wherein an end cable 62 similarly connects the second press 25 and the end carriage 16. The cables 61, 62 may be of braided steel wires for both flexibility and durability.

Upon retraction of the actuator 60 with simultaneous extensions of the actuators 22, 26, the whole rib forming apparatus 10 slides over the plate material two pitches corresponding to two ribs and their adjacent plate sections back toward its fresh blank section to mold another two ribs at the same time.

As soon as the plate material receives new rib crimping at the molding phase of FIG. 4B, the subsequent extension of the actuator 60 automatically advances the processed plate section one pitch followed by another retraction of the actuator 60 for the next rib molding. Meanwhile, the plate material is held from moving backward with the assist of a simple angled stick (not shown) fixed to an output area of the table 11 for catching the ribs one way.

Figure 5:
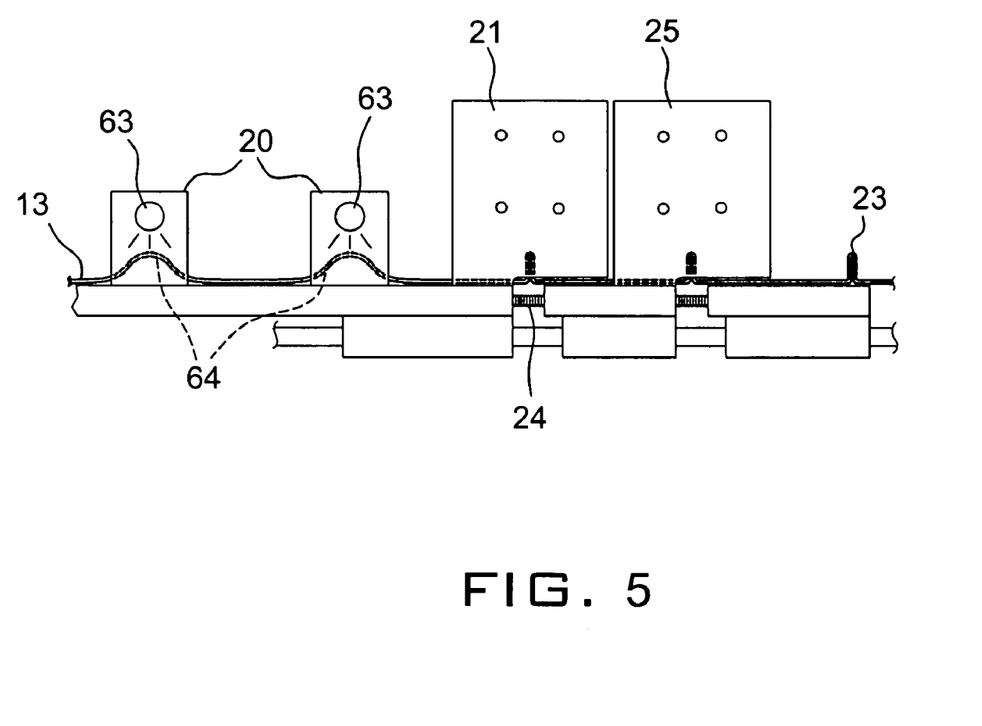
FIG. 5 is a schematic side view of the rib forming apparatus.
Figure 6A:
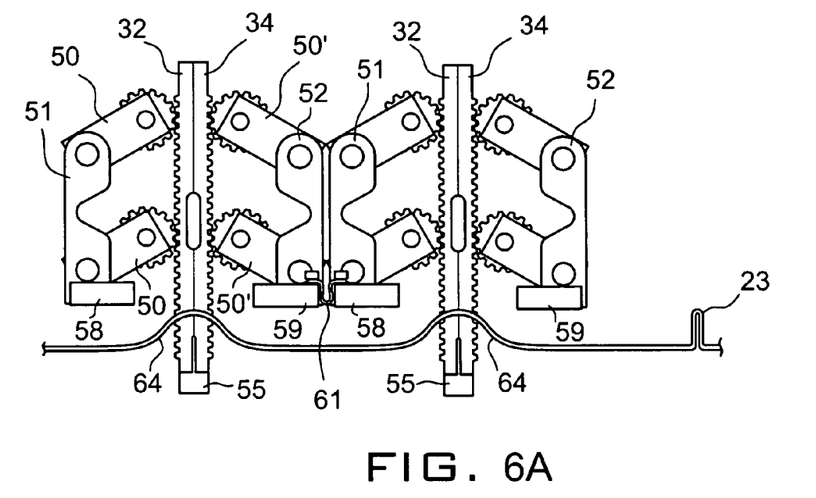
FIG. 6A is a side view of the press station of the rib forming apparatus showing the double mold positioned surrounding the heat-treated web from a previous stage before it is shaped.
Figure 6B:
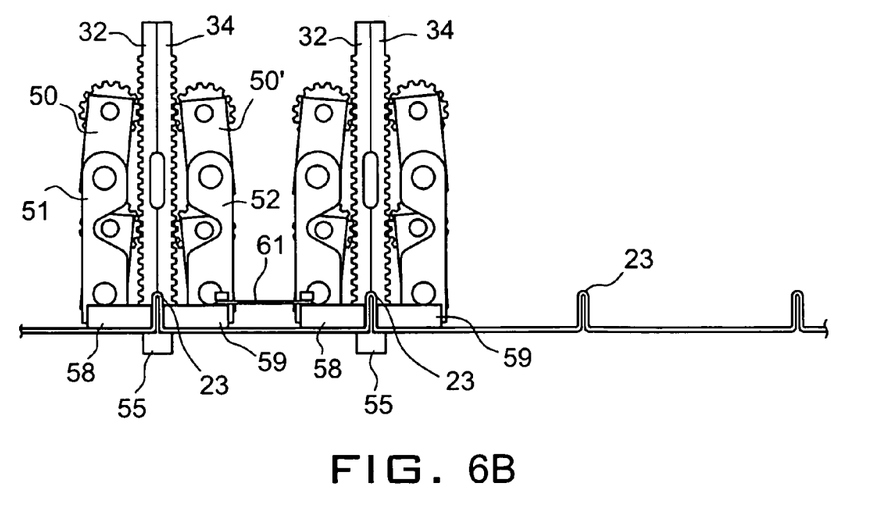
FIG. 6B is a side view of the press station of the rib forming apparatus with the double mold actuated to make two rib folds of the web in the same pitch as leading rib folds formed earlier.

Referring to FIGS. 5, 6A and 6B, the method of forming ribs 23 on plastic plate 13 by using the present apparatus 10 is described. FIG. 5 shows the positioning of the two heaters 20 with suspended heat cores 63 under which upward bends 64 of the plate 13 are initiated during a thermal deformation that also softens the plate 13 in preparation for the subsequent hot clamp-molding step. For a set pitch of the ribs, the distance of the heaters 20 from each other and the first press 21 is firmly determined considering the shrinking length of the plate by the right-angled sidewalls and the connecting bends which amount to two adjacent ribs 23. Therefore, the distance between the heaters 20 is correspondingly longer than the distance between two adjacent ribs 23. Whereas, the distance between the longitudinal centers of the presses 21, 25 become the pitch of the ribs 23. Thus, the pitch may be modified by adding the distance between the presses 21, 25 with the use of a spacer affixed to one of the base plates at its abutting side and correspondingly increasing the distance between the heaters 20.

In FIG. 6A, as rack gears 32, 34 switch from their extended to retracted positions along with the central blade 55 swinging the side blades 58, 59 apart, they are transported back to the molding position shown from where they had released the last rib 23. FIG. 6B depicts the moment when the presses are closed at the exact positions coinciding the pitch of the ribs that can be compared to the longer distance between the two open presses in FIG. 6A. With the ribs closed in the presses they will advance all together to output the finished plate section pulling the next hot bends 64 of the plate 13 toward the molding positions.

Figure 7A:
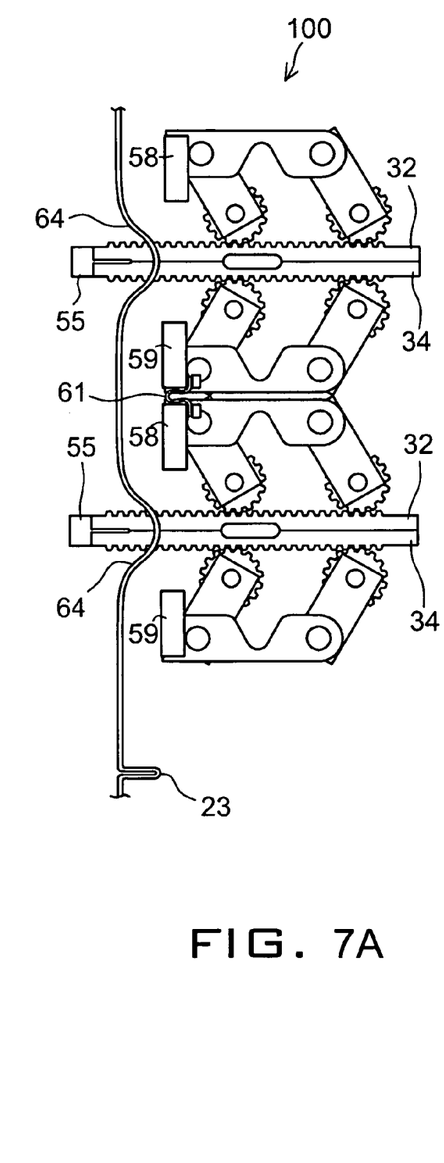
FIGS. 7A and 7B are side views of a press station according to a second embodiment of a rib forming apparatus of the present invention with vertical orientation.
Figure 7B:
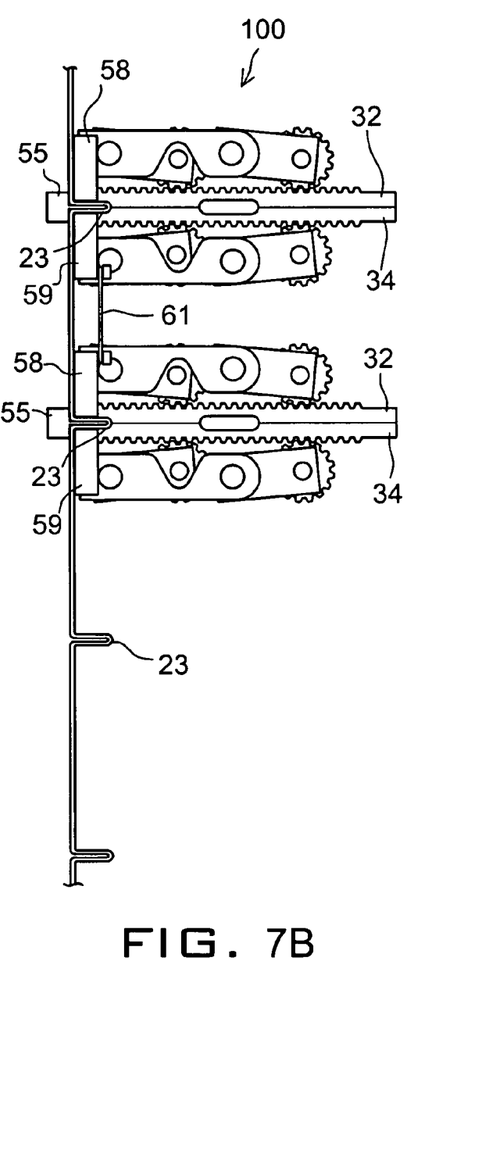

FIGS. 7A and 7B are side views of a press station according to a third embodiment of a rib forming apparatus 100 of the present invention oriented vertically. By having the entire apparatus 100 turned with appropriate frame modification to support this way, it requires only little area to set up the lengthy apparatus. Changing the direction of advancement of the plate material 13 brings the advantage of gravity effect of naturally straightening the finished plate. In this orientation, the rib forming apparatus 100 may be installed as a vertical end unit to a bigger plastic processing plant. The detailed movements of the components remain unchanged.

Figure 8:
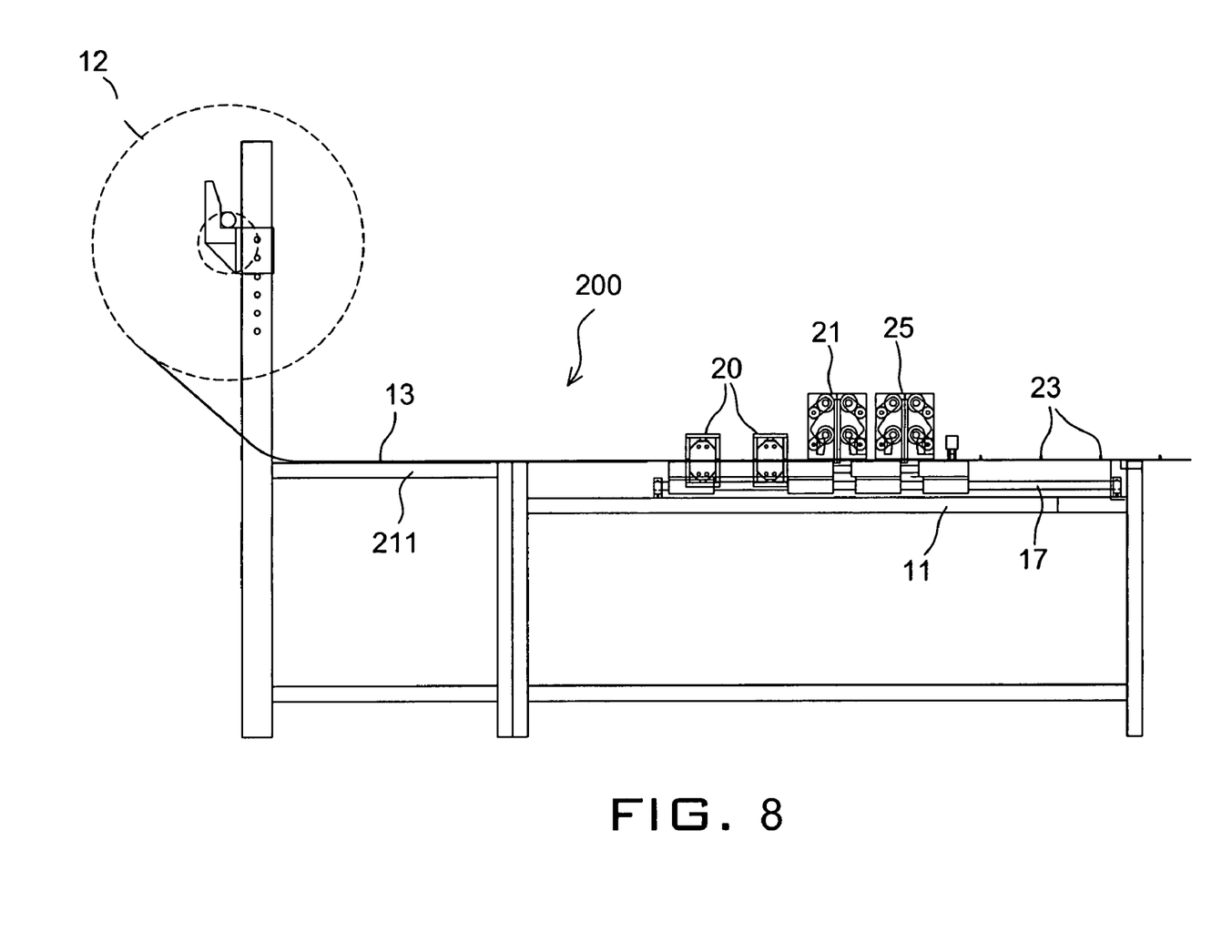
FIG. 8 is a side view of a rib forming apparatus according to a third embodiment of the present invention having an extended bed area to flatten the unreeled web material before processing.

FIG. 8 is a side view of a rib forming apparatus 200 according to a second embodiment of the present invention having an extended bed area 211 to flatten the unreeled web material 13 before processing. The remaining parts of the apparatus 200 are unchanged from the first embodiment.

Figure 9:
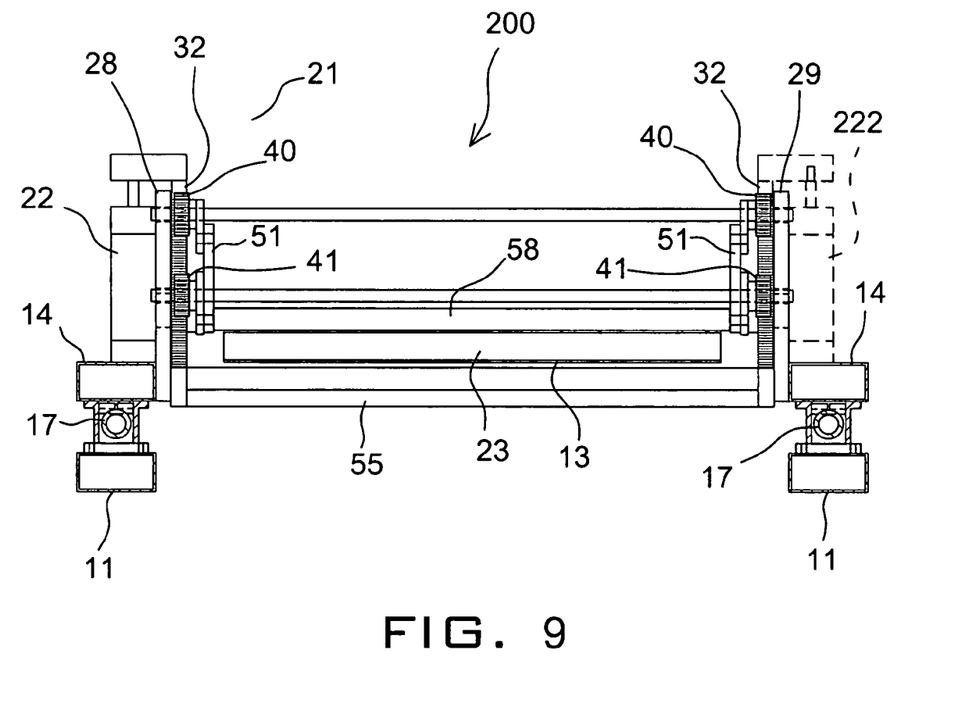
FIG. 9 is a front view of the rib forming apparatus of the present invention.

FIG. 9 is a partly cross sectional front view of the rib forming apparatus 200 of FIG. 8 with heaters 20 removed to show the molding press assembly comprising support table 11, parallel rods 17 fixed to table 11, and press 21 having base plates 28, 29 mounted on opposite ends of carriage 14, which is in turn mounted on parallel rods 17. Actuator 22 will move rack 32 and pinion 40, 41 gears to close and open molding blades 55, 58 to and from plate material 13.

A second actuator 222 similar to actuator 22 may be installed at its opposite side to double the power of the molding press 21 when the rib forming apparatus needs to process a thicker plate material.

Figure 10:
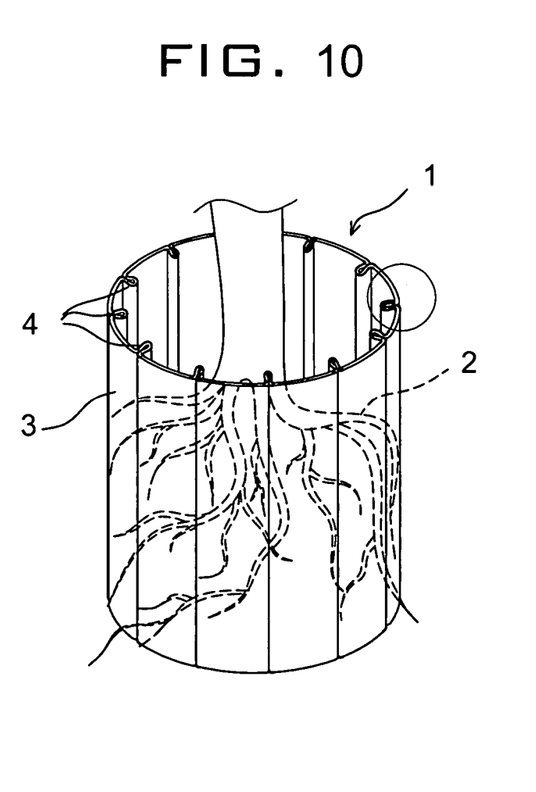
FIG. 10 is a perspective view of a root barrier made by the rib forming apparatus of the present invention.
Figure 11:
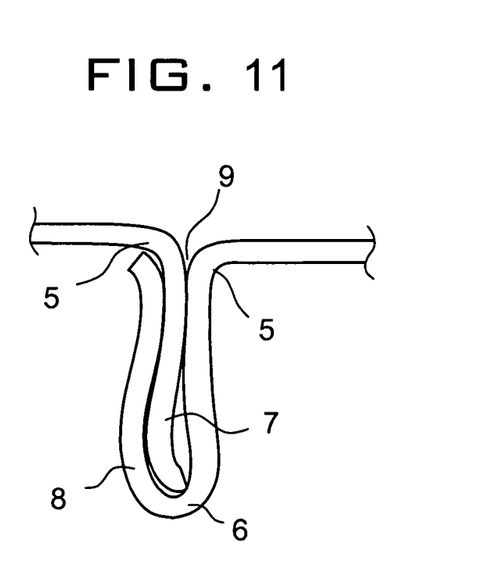
FIG. 11 is an enlarged view of the root barrier of FIG. 10 in circle at an interlocking engagement between the opposite end ribs.

Referring to FIGS. 10 and 11, one example of the product manufactured by the present rib forming apparatus will be described.

Barrier sheet 1 may be used a sleeve for limiting the growth of a root of tree 2. The barrier sheet 1 has a constant thickness of approximately one-sixteenth of an inch. One available width of the sheet 1 is eighteen inches, but twelve, twenty-four, thirty-six and forty-eight inch sizes can also be produced by the present rib forming apparatus without departing from the principle of the present invention. Those widths become the depth of the barrier at installation on a landscape site.

The sheet 1 has a built-in modular feature which allows for cutting and joining any combination of sheet sections to alter the diameter of the root barrier to fit any particular tree size.

For the root barrier material, the sheet 1 is preferably of polyethylene, and the substitute material polystyrene can also be used. Long-lasting materials such as resin tiered graphite laminates, plastic molded and extruded materials such as PVC, polyethylene, polystyrene, and polypropylene are also suitable. Thin metal sheet material can also be used.

The sheet 1 consists of rectangular flat areas 3 once the sheet is cut and assembled into a root barrier. Across the two longitudinal edges of the sheet are vertical folds 4, which appear at an even interval throughout the length of the sheet 1. The length of the interval between the folds 4 is typically five inches, but can be altered as desired. As shown, the vertical folds 4 are adapted to face the interior of the assembled root barrier. The folds 4 form vanes that are aligned vertically and protrude perpendicularly from the sheet 1. The vanes 4 redirect roots 2 away from the inner surface of the barrier sheet 1. As roots grow toward the inside surface of the barrier, the vanes channel the roots downward to provide strength for new plantings.

Each of the vertical folds 4 includes three severing lines with two proximal perpendicular bends 5 and a distal U-bend 6 connecting the vertical walls of the fold 4 between the proximal bends 5. This allows the sheet 1 to be cut at the desired lengths to create the appropriate diameter for the root barrier. An installer crosscuts or snaps the sheet 1 at one edge, leaving an end lip 7 and at the opposite edge forming an end clip 8. This consequently provides an interlocking gap 9 for closing the sheet into the root barrier 1.

Installation of the root barrier 1 is accomplished by simply wrapping the cut sheet around the tree root being planted, with the vertical folds 4 facing the root 2. Then the end lip 7 is superimposed on one of the clips 8 and pressed toward each one another by hands.

It is to be understood that the present invention is not limited to the sole embodiment describe above, but encompasses any and all embodiments within the scope of the following claims.

CALL OUT LIST OF ELEMENTS

1: Root Barrier
2: Root
3: Flat Area
4: Vane
5: Prominal Bend
6: U-bend
7: End Lip
8: End Clip
9: Interlocking Gap
10: Rib Forming Apparatus
11: Support Table
12: Material Roll
13: Elongated Plate
14: First Carriage
15: Second Carriage
16: End Carriage
17: Rod
20: Heater
21: First Press
22,26: Vertical Actuator
23: Rib
24: Expansive Fastener
25: Second Press
27: Control Box
28,29: Base Plate
30,31: Legs
32,33: Rack Gears
34,35: Reciprocating Rod
38,39: Cross Member
40,41: Pinion Gears
42,43: Shaft
44,45,44',45': Bore
46,47: Pinion Gear
48,49: Shaft
50,50': Arm
51,52: Cross-link
53,54: Rack Gears
55: Central Blade
56,57: Corner
58,59: Side Blade
60: Carriage Actuator
61: Cable
62: End Cable
63: Heater Core
64: Bend
100,200: Rib Forming Apparatus
211: Extended Bed
222: Second Actuator

The invention claimed is:

1. A rib forming apparatus comprising:
   a. a support table that is elongated with a roll of plastic material held at a starting end;
   b. a supply of thermoplastic sheet material fed from the roll and passing over the support table;
   c. a carriage mounted on the table to slide lengthwise in the direction of the supply that passes over the support table, wherein the carriage has a starting position, and an ending position;
   d. a carriage actuator for moving the carriage sideways between the starting position and the ending position, wherein the actuator is electrically connected to a controller;
   e. a heater, wherein the heater is mounted to the support table, and wherein the heater provides local heating of the sheet material;
   f. a press activated by a vertical actuator, and
   g. a pair of crimping grips positioned at an opposite flat side of the thermoplastic sheet material, and a crimping grip actuator connected to the pair of crimping grips, wherein the pair of crimping grips mold a heated section of the sheet material when the crimping grip actuator swivels the pair of crimping grips from open position to a closed position, wherein the open position corresponds with the pair of crimping grips being open and not gripping the thermoplastic sheet material, wherein the closed position corresponds with the pair of crimping grips being closed and gripping the thermoplastic sheet material, wherein the controller is configured to close the pair of crimping grips for grabbing the material, wherein the controller is configured to then slide the carriage away from the stalling end to pull out and advance the supply of thermoplastic sheet material, and wherein the controller is configured to then actuate the crimping grip to release the thermoplastic sheer material, and slide back to the starting position.

2. The rib forming apparatus of claim 1, wherein the support table extends horizontally.

3. The rib forming apparatus of claim 1, wherein the crimping grip is actuated by a rack and pinion gear set forming a four bar parallelogram linkage actuated by the crimping grip actuator via a reciprocating rod which is attached to a distal end of the rack and pinion gear set so that rack gears reciprocate at the same time to rotate two pinion gears meshed therewith, wherein pinion gears have arms fixed thereto and cross-links pivotally connecting adjacent arms to form a parallelogram linkage.

4. The rib forming apparatus of claim 1, wherein the supply of thermoplastic sheet material is selected from resin tiered graphite laminates, thermoplastic materials including PVC, polyethylene, polystyrene, and polypropylene.

5. The rib forming apparatus of claim 1, further comprising a central blade cooperating with the pair of crimping grips, wherein the central blade is shaped as an inverted T and presses from below, wherein the central blade presses between the pair of crimping grips which forms a rib structure on the thermoplastic sheet material, wherein the central blade has a reciprocating motion beginning from a retracted position away from a plane of the thermoplastic sheet material, wherein the central blade has an extended position protruding between the pair of crimping grips, wherein the extended position is passed the plane of the thermoplastic sheet material.

6. The rib forming apparatus of claim 5, wherein the support table extends horizontally.

7. The rib forming apparatus of claim 6, wherein the crimping grips are actuated by rack and pinion gear sets forming parallelogram linkages actuated by the actuator with reciprocating rods, which are attached to distal ends of the rack and pinion gears so that the rack gears reciprocate at the same time to rotate two pinion gears that are meshed therewith, wherein the pinion gears have arms fixed thereto and cross-links pivotally connecting two adjacent arms to form a pair of parallelogram linkages.

8. The rib forming apparatus of claim 5, further comprising:
   h. a second carriage, also mounted on the table to slide lengthwise in the direction of the supply that passes over the support table, wherein the second carriage also has a starting position, and an ending position;
   i. wherein the actuator moves the second carriage, wherein the carriage is attached to the second carriage
   j. a second heater, wherein the second heater provides supplemental local heating of the sheet material;
   k. a second press activated by a second vertical actuator;
   l. a second pair of crimping grips positioned at the opposite flat side of the thermoplastic sheet material; wherein the second pair of crimping grips moves in unison with the first pair of crimping grips, wherein the controller is configured to close the second pair of crimping grips for grabbing the material, wherein the controller is configured to then slide the second carriage away from the starting end to pull out and advance the supply of thermoplastic sheet material, and wherein the controller is configured to then actuate the second pair of crimping grips to release the thermoplastic sheet material, and slide back to the starting position.

9. The rib forming apparatus of claim 5, wherein the support table extends horizontally.

10. The rib forming apparatus of claim 6, wherein the crimping grips are actuated by rack and pinion gear sets forming parallelogram linkages actuated by the actuator with reciprocating rods, which are attached to distal ends of the rack and pinion gears so that the rack gears reciprocate at the same time to rotate two pinion gears that are meshed therewith, wherein the pinion gears have arms fixed thereto and cross-links pivotally connecting two adjacent arms to form a pair of parallelogram linkages.

11. The rib forming apparatus of claim 10, wherein the support table extends horizontally.

* * * * *